United States Patent Office 2,911,425
Patented Nov. 3, 1959

2,911,425

CUPROUS COMPLEXES OF ORGANIC CYANO COMPOUNDS AND PROCESS OF MAKING SAME

Mario Scalera, Somerville, Frederick Brody, Plainfield, Charles Loos Zimmerman, Middlesex, and August Bernard Ulmes, Dunellen, N.J., assignors to American Cyanamid Company, New York, N.Y., a corporation of Maine No Drawing. Application September 14, 1953
Serial No. 380,126

5 Claims. (Cl. 260—438)

The present invention relates to improved cuprous ion complexes and particularly to a novel method for their manufacture.

Most acid and direct dyes are not substantive to fibers of acrylonitrile polymers. In order to overcome this drawback, it has been proposed to dye in the presence of cuprous ions the so-called cuprous ion method of dyeing. While it has been possible by this means to effect satisfactory dyeings with acid and direct dyes, a number of difficulties have arisen.

When the cuprous ion is produced in the dye bath, for example, by the reaction of copper sulfate and reducing agents, it is not very stable in solution. As a result in neutral or alkaline media there is a tendency for cuprous oxide to precipitate, whereas in acid medium the cuprous ion may disproportionate to free copper and cupric ion. In each case, the shade of the dyeing is affected and this usually results in a comparatively dull dyeing.

Another drawback lies in the tendency of the cuprous ion to be oxidized by atmospheric oxygen to the cupric state. In order to prevent this, rather large excesses of reducing agent have been used which go far beyond the stoichiometric amount required for the initial reduction of the copper sulfate. Reducing agents when used in excess add materially to the expense of the dyeing. An even more serious result is obtained with certain dyes which are not stable to the reducing agent present in large excess. These dyes are partly reduced, which again results in a change in shade or, even if the dyeing is not off shade, additional cost is involved because the destroyed dyestuff is wasted.

As a result a compromise has been necessary in choosing a reducing agent which causes the least damage and affects the fewest number of dyes. In practice the reducing agent usually chosen is hydroxyl-ammonium sulfate. Unfortunately, this reducing agent is relatively expensive, adding still further to the economic disadvantage of the cuprous ion dyeing method.

Another disadvantage of the ordinary cuprous ion method is unduly rapid exhaustion of the dye, especially when a large concentration of cuprous ion is formed in solution. This excessive speed of exhaustion results in surface dyeing with poor penetration so that the final dyeing is not level, crocks badly, and does not build up to high strength for a given use of copper.

Proposals have been made to avoid or to minimize the disadvantages set out above by carrying out the reduction of the cupric sulfate to the cuprous ion at a strictly controlled rate so that there is never a high concentration of free cuprous ion in solution. This controlled reduction, while theoretically possible, slows up dyeing and requires unnecessarily critical control. Both these factors are economically undesirable.

According to the present invention, we have found that if the cuprous copper is present in the form of a particular restrictive group of complex ions the difficulties are avoided and the fibers of polyacrylonitrile or its copolymers can be dyed deep, level shades with a maximum of reliability. No large excess of costly reducing agent is necessary, and the ordinary acid and direct dyes are not adversely affected.

Not all complex cuprous copper ions can be used, for while it is desirable to produce a sufficiently stable complex ion so that oxidation, disproportionation and other difficulties are avoided in the dyebath, it is also necessary that the cuprous ion be sufficiently reactive so that it will enter into the dyeing reaction. Thus, for example, complex ions derived from thiourea and its derivatives, ammonia, inorganic cyanides, and thiosulfates, are completely useless as they are so stable that the dye does not exhaust properly from the bath to the fiber.

We have found that only certain complexing agents are useful. These agents are organic compounds having at least one cyano group. A fairly wide range of compounds is nevertheless useful and they may contain other functional groups besides the cyano group. Illustrative compounds of this type which may be used include the lower aliphatic dinitriles, such as succinonitrile and glutaronitrile and oxygenated nitriles such as beta,beta-dicyanoethyl ether, beta-hydroxypropionitrile, glycolonitrile, lactonitrile, and beta-methoxypropionitrile. Also useful are cyano compounds which contain additional nitrogen in the molecule, such as cyanoacetamide, cyanamide, dialkylcyanamides and bis-cyanoethylcyanamide. Likewise other substituents may be present, such as halogen or sulfur, as beta-chloropropionitrile, and beta-beta'-thiodipropionitrile.

Particularly useful complexing agents are the cyanoguanidines such as cyanoguanidine itself, 1-alkyl-3-cyanoguanidines, 1-phenyl-1-methyl-3-cyanoguanidine, 1-acetyl-3-cyanoguanidine, 1-acetyl-3-cyanoguanidine, 1-carbalkoxy-3-cyanoguanidines, such as 1-carbethoxy-3-cyanoguanidine, 1-carballyloxy-3-cyanoguanidine, and the like.

In general, the anion to which the complex cuprous ion is united is unimportant, and any of the ordinary ions such as sulfate or nitrate may be used. It is also possible to work with chlorides, but here it is necessary to proceed with caution because if there is too much chloride ion present, more than one mol per mol of cuprous ion compound, the latter may complex with the chloride ion itself instead of with the desired complexing agent. In general, it is best to select the anion on the basis of the solubility of the complex salt.

It is an advantage of the present invention that the method of introducing the complex cuprous ion into the dye bath is in no sense critical. Thus, the complexing agent may be added to the dyebath before or during reduction of the copper sulfate, in which case the stable complex cuprous ion is formed in solution. Or the complex cuprous ion may be formed as a soluble crystalline salt which can either be added directly to the bath or can be blended with the dye powder itself. The latter two methods are preferred, as the dyeing procedure is considerably simplified since the dyer does not need to preform the reduction in the dye bath but adds a pre-formed complex salt in which the copper is already in the cuprous state. The blend of complex cuprous compound with the dyestuff itself is even simpler and presents the additional advantage that a dyer can purchase dyes which can be used without further treatment.

In every case, the present invention presents numerous advantages over the ordinary cuprous ion dyeing methods. First, there is no strong reducing agent in the dyebath, and so there is no danger of destroying any sensitive dyestuffs. The cuprous copper is present in the dyebath in a form in which it is relatively stable, and brighter and stronger dyings are obtainable than with the ordinary method. The shades are often very close to those obtained on natural fibers, and it is an advantage of the invention that the dyeing procedure operates successfully on natural fibers, both cellulosic and basic nitrogenous. This is often possible to obtain satisfactory union dyeings.

While the complex cuprous ion is relatively stable toward oxidation by air and theoretically no additional reducing agent is required, we have found that it is sometimes advantageous to use a small amount of a mild reducing agent, such as a sulfite. This reducing agent is really used more as an anti-oxidant and need not be so active that it could reduce sensitive dyes. If the dyeing is carried out in the absence of air, as e.g., under an atmosphere of nitrogen, there is no need for the addition of such an antioxidant. In large scale dyeing operations, especially in closed equipment, where there is little or no access of air, the addition of an antioxidant is unnecessary.

One of the advantages of the present invention is that the cuprous ion is released by the complex to the fiber only gradually so that better penetration of the dye into the fiber is obtained, with level dyeing and no crocking. It is also possible to build up stronger dyeings for a given usage of copper than in the ordinary cuprous ion dyeing method. When the preferred modification in which the complex cuprous compound is blended with the dye is employed, it is also possible to adjust accurately the amount of cuprous ion for each individual dye to give optimum results, and this adjustment requires no further effort on the part of the dyer.

It is an advantage of the present invention that the improved results obtained do not require any material changes from the well-known acid dyeing procedures. On the other hand, pH is important as in the ordinary process, and necessary pH adjustments can be made with the usual reagents. While the optimum pH will vary somewhat from one dye to another, in general the dyebath should be acid, and the optimum pH will ordinarily lie in a range from 2 to 6.

When the complex cuprous ion is to be added to the bath, this may be effected in various ways; for example, the whole of the complex cuprous ion may be added before any dye is added, or it may be added in portions while the fiber is being heated with a solution of the dye. The best method to use will depend on operating conditions, and it is an advantage of the present invention that it presents great flexibility in this regard.

It is a further advantage of the present invention that it is not limited to any particular method of spinning the polyacrylonitrile fiber and is applicable to the various commercial fibers, either those spun from a solution of the polymer in an organic solvent, such as the fibers sold by the duPont Company under their trade name of "Orlon" or fibers spun from aqueous cold thiocyanate solutions such as a fiber produced by the American Cyanamid Company and designated "X-51." This is in marked distinction to certain processes of dyeing with vat dyes in which the nature of the spinning markedly affects the dyeability of the fiber.

In another modification of the invention improved results are obtained by subjecting the polyacrylonitrile fiber to a preliminary scouring in the presence of a cationic agent which is an aliphatic amidopropyl quaternary ammonium salt. These cationic agents are described in the patent to Cook and Moss, No. 2,589,674. This is followed by the ordinary dyeing procedure with the aid of the cuprous complex salt as described above. It has been found that this modification permits using a much smaller quantity of the cuprous complex for obtaining a desired strength of dye, which is a definite economic advantage.

The amount of the cuprous ion complex is not critical.

Of course, it cannot be used in minute amounts, and in general at least 0.25 part of the complex per part of dye is necessary. Larger amounts of complex may be used, but in general excessive amounts of complex are not desirable, as they do not improve the resulting dyeing and merely add to the cost.

Some of the cuprous ion complexes which may be used in the present process are also themselves new chemical compounds and in one aspect of the present invention are included as such. While, of course, the cuprous ion complexes which are new chemical compounds are not restricted to any particular method by which they are prepared, there is included in a specific modification of the invention an improved process. We have found that it is possible to effect the production of the cuprous ion complex by reducing cupric compounds such as cupric sulfate, acetate and the like in aqueous media in the presence of a complexing agent and introducing a desired anion, if it is not already present, in the form of its sodium salt. This process presents a very definite advantage as it is possible to use a wide variety of reducing agents many of which are much milder than could be used in the dyebath in the old cuprous ion dyeing method. This not only gives a much wider choice of reducing agents but also permits the use of relatively cheap reducing agents whereas in the old cuprous ion dyeing procedure it was often necessary to use relatively expensive reducing agents such as hydroxylamine and its derivatives. The reducing agents used include the ordinary reducing agents such as sulfur dioxide, sodium bisulfite, hydroxylamine, sodium thiosulfate, glyoxal, furfural, sodium formaldehyde sulfoxylate, and the like. Instead of reducing the soluble cupric compound in the presence of a complexing agent and permitting the complex salt to precipitate out, it is possible to use simple insoluble cuprous compounds such as cuprous chloride, cuprous bromide, or cuprous oxide. These compounds are slurried in an acidulation aqueous medium in the presence of a complexing agent and give the complex salt directly, or in the case of the cuprous oxide, the desired anion may be introduced in the form of its sodium salt. In general, it is desirable to use complex salts which are soluble in water at least at elevated temperatures, and with slight acidulation to prevent hydrolysis.

The direct and acid dyes which can be used in the present invention are characterized by the presence of a sulfonic group. Actually a variety of organic compounds can be used, all containing a sulfonic group, including colorless ones, such as the alkylsulfonic acids, for example, ethyl sulfonic acid, dodecyl sulfonic acid and the like, or aryl sulfonic acids such as those of benzene, toluene, naphthalene and the like. Other compounds are colorless but fluorescent and are of use as optical brighteners and the like. Typical of such compounds are 4,4'-dibenzoylaminostilbene-2,2'-disulfonic acid, 4,4'-bis(2-methoxybenzoylamino) stilbene-2,2'-disulfonic acid, 4,4'-bis(2-ethoxybenzoylamino) stilbene-2,2'-disulfonic acid, 4,4'-bis(4-methoxybenzoylamino) stilbene-2,2'-disulfonic acid, 4,4'-bis(4-methyl-2-methoxybenzoylamino) stilbene-2,2'-disulfonic acid, 4,4'-bis(2,4-dimethoxybenzoylamino) stilbene-2,2'-disulfonic acid, the similar acyl derivatives of sulfonated 3,7-diaminodibenzothiophene-5-dioxide (U.S. Patents 2,563,493 and 2,563,795) and 1,3,5-triazinylderivatives of both the stilbenes and the dibenzothiophene dioxides.

By far the most important class of direct and acid dyes are azo dyes of which the following are typical examples, the naming of which is by the conventional method in which a dashed arrow indicates diazotizing and coupling:

Sulfanilic acid→2-naphthol (Color Index 151)
Naphthionic acid→2-naphthol-6,8-disulfonic acid (Color Index 185)
Naphthionic acid→1-naphthol-4-sulfonic acid (Color Index 179)

Aminoazobenzene-4-sulfonic acid→2-naphthol (Color Index 275)

Chrome dyes such as:

1 - amino - 2 - naphthol - 4 - sulfonic acid→2 - naphthol (Color Index 202)

Direct dyes such as:

Ethylated 2 - naphthol - 6,8 - disulfonic acid←benzidine→phenol (Color Index 382)
Dianisidine⇉(8 - amino - 1- naphthol - 5,7 - disulfonic acid)$_2$ (Color Index 518)
Salicyclic acid←benzidine→(resorcinol←2 - aminophenol-4-sulfonic acid, copperized)

Metallic dyes such as:

The chromium complex of 4-nitro-2-aminophenol-6-sulfonic acid→acetoacetanilide
The chromium complex of 4-chloroanisidine→2-naphthol-6,8-disulfonic acid
The chromium complex of 1-amino-2-naphthol-4-sulfonic acid→1-naphthol-8-sulfonic acid Anthraquinone dyes such as:

1 - amino - 2 - bromo - 4(2 - sulfo - 4 - methylanilino)anthraquinone (Color Index 1088)
1,5 - diamino - 4,8 - dihydroxyanthraquinone - 3,7-disulfonic acid (Color Index 1054)
1,4 - bis - (2 - sulfo - 4 - methylanilino)anthraquinone (Color Index 1078)

quinoline dyes such as Quinoline Yellow (Color Index 801), which is a sulfonated mixture of 2-quinolylindandione and 2-quinaldylene phathalide, thiazole dyes such as Direct Fast Yellow (Color Index 814) which is an oxidation product of dehydrothioparatoluidine sulfonic acid and Primuline (Color Index 812) which is a mixture of the sulfonic acids of highly thionated dehydrothioparatoluidine and dehydrothioparatoluidine, stilbene dyes such as Direct Yellow R (Color Index 620) which is principally azoxyazodistilbene tetrasulfonic acid, and azine dyes such as Wool Fast Blue (Color Index 833) which is sulfonated dialkylaminophenylamino-phenylnaphthophenazonium chloride.

As has been pointed out above in the preferred modification of the present invention in which the complex cuprous compound is mixed or blended with the dyestuff, it is sometimes desirable to incorporate a certain amount of reducing agent. This is not for the purpose of producing the cuprous ion itself which is present in its preformed state but may be needed in small amounts as an antioxidant. For instance, most samples of water contain dissolved air, and it is desirable to prevent any oxidation while the transfer of the cuprous ion is taking place to the fiber. The reducing agents include the following: hydroxylamine salts, sodium or zinc formaldehyde sulfoxylate, sodium bisulfite, and sodium dihydrogen hypophosphite. Where the dyeing is effected in the absence of air, of course the reducing agent is not necessary, and in general, the effect of dissolved air is not very serious in large-scale dyebaths.

The invention will be illustrated in the following specific examples in which the parts are by weight unless otherwise specified.

The first 8 examples relate to the production of cuprous ion complexes which are in themselves new chemical compounds; the remaining examples dealing with processes of dyeing, utilizing the cuprous ion complexes in the present invention.

EXAMPLE 1

*Cuprous dicyandiamide sulfate*

To a solution of 10 parts cupric acetate monohydrate containing 7 parts acetic acid in 250 parts water is added a solution of 13 parts dicyandiamide in 100 parts water, and the mixture warmed to about 60° C. Then 4.75 parts sodium bisulfite is added portionwise, the blue solution is immediately decolorized and a thick white precipitate appears. This is filtered off at room temperature, washed with water, and dried in vacuo; 13.3 parts fine white powder. The product gives a positive test for cuprous copper, and for sulfate ion. A portion recrystallized from very dilute sulfuric acid is shown by elementary analysis to be $[Cu(C_2H_4N_4)_2]_2SO_4$.

EXAMPLE 2

*Cuprous bis-dicyandiamide nitrate*

A solution of 25 parts cupric sulfate pentahydrate, 25.5 parts dicyandiamide, and 127 parts sodium nitrate in 500 parts water is treated at 95° C. with 9.4 parts sodium bisulfite added portionwise until the blue color of the solution is almost entirely discharged, and a heavy white precipitate is formed. The mixture is cooled to room temperature, the precipitate is filtered off, and washed with water, then dried in air. The product is soluble in water on warming, gives a negative test for sulfate ion, a very faint test for cupric copper, and a strong test for cuprous copper.

A portion recrystallized from water slightly acidulated with nitric acid has an elementary analysis corresponding to $Cu(C_2H_4N_4)_2NO_3$.

In the above example, for the sodium bisulfite one may substitute 8.25 parts hydroxylammonium sulfate as the reducing agent.

EXAMPLE 3

*Cuprous bis-dicyandiamide nitrate*

To a solution of 10 parts cupric acetate monohydrate, 33.6 parts dicyandiamide, and 7 parts acetic acid in 200 parts water is added 5 parts copper powder, and the mixture is heated at the boil until the blue color of the solution is virtually discharged. The hot solution is clarified to remove unreacted copper, and to the filtrate is added 25 parts sodium nitrate crystals. A thick white slurry is obtained, which is filtered at room temperature. The white crystalline residue is washed with water, and has the same properties as the product of the previous example.

EXAMPLE 4

*Cuprous dicyandiamide chloride*

To a solution of 20 parts cupric acetate monohydrate, 33.6 parts dicyandiamide, and 7 parts acetic acid in 200 parts water maintained above 90° C. is added portionwise over ten minutes 7 parts hydroxylammonium chloride. The solution is heated till the evolution of gas practically ceases, and its color becomes a pale yellow green. The complex salt, cuprous dicyandiamide chloride, begins to precipitate from the hot solution, and precipitation is completed by stirring to room temperature. The white needles are filtered off, washed with water containing a small amount of acetic acid, and dried in vacuo. A portion is recrystallized from hot water acidulated with acetic acid, whereupon its elementary analysis shows it to be $Cu(C_2H_4N_4)Cl$.

In the above example instead of hydroxylammonium chloride one may use as the reducing agent 9.4 parts sodium bisulfite, adding also 30 parts sodium chloride crystals to furnish chloride ion.

EXAMPLE 5

*Cuprous dicyandiamide chloride*

Into 200 parts water acidulated with 5 parts acetic acid is stirred 5 parts cuprous chloride, and the slurry heated above 70° C. Then 8.6 parts dicyandiamide dissolved in 75 parts water is added, and the mixture heated to the boil with stirring till a complete solution is obtained. On cooling, the white needles of cuprous dicyandiamide chloride precipitate and are obtained by filtration.

EXAMPLE 6

*Cuprous di-glutaronitrile nitrate*

To a solution of 8.33 parts copper sulfate pentahydrate, 12.5 parts plutaronitrile, and 5.5 parts sodium nitrate in 175 parts water is added at 95° C. 3.13 parts sodium bisulfite gradually in portions. When the color of the solution is virtually discharged, the mixture is cooled to room temperature, and the thick white precipitate is filtered off, washed with very dilute nitric acid, and dried in a vacuum. If further purification is desired, the product may be recrystallized from very dilute nitric acid. Elementary analysis then corresponds to the formula $Cu(C_5H_6N_2)_2NO_3$.

In the above example in place of sodium bisulfite one may use as the reducing agent 2.75 parts hydroxylammonium sulfate added as a solution in water.

EXAMPLE 7

*Cuprous bis-(bis-cyanoethyl ether) nitrate*

A solution of 12.5 parts copper sulfate pentahydrate in 250 parts water is reduced with 4.7 parts sodium bisulfite added portionwise at about 95° C. in the presence of 24.8 parts bis-cyanoethyl ether. The addition of 4.25 parts sodium nitrate gives a precipitate of white needles which is filtered off at 10° C., washed with very dilute acetic acid and dried in a vacuum. Recrystallization from very dilute acetic acid gives a pure product whose elementary analysis corresponds to the formula $Cu(C_6H_8ON_2)_2NO_3$.

In the above example for the reducing agent one may use 4.1 parts hydroxylammonium sulfate.

EXAMPLE 8

*Cuprous cyanoacetamide chloride*

A hot solution of 25 parts copper sulfate pentahydrate in 400 parts water is reduced with 8.8 parts hydroxylammonium sulfate in the presence of 33.6 parts cyanoacetamide. After heating to 95° C., 5.8 parts sodium chloride is added, the solution is cooled, and the white crystalline precipitate is filtered off, washed with dilute acetic acid, and dried in vacuum. The product gives a test for cuprous copper and for chloride ion, and may be recrystallized from dilute acetic acid.

EXAMPLE 9

Five parts of polyacrylonitrile fiber spun from cold aqueous thiocyanate solution as described in the U.S. Patent No. 2,558,730 (Cresswell to American Cyanamid Co.) are entered in the form of a skein into 150 parts of water. There are added solutions of 0.05 part of the dye of Color Index 185, to 0.2 part of sulfuric acid and 0.375 part of the product of Example 2, which is added in the form of a 0.5% solution prepared by warming in water at 180° F. The amounts of the various components calculated on the weight of the fiber amounts to 1% dye, 4% sulfuric acid and 7.5% of the cuprous complex salt. The dye bath is heated to 200° F., a clear solution resulting, and is maintained at this temperature until dyeing is complete. Complete exhaustion of the dye from the liquor has occurred, whereupon the skein is removed, rinsed and dried. The skein shows a bright scarlet shade, which shows little difference from the shade of the same dye when applied to wool from an acid bath. The strength of color on the two fibers is also about equal. The dyeing on polyacrylonitrile is distinguished by its brightness, levelness, and excellent fastness to crocking.

When the same dye is applied to the polyacrylonitrile by the ordinary cuprous ion method, 5% copper sulfate pentahydrate is required for complete exhaust, together with 2.5% hydroxylammonium sulfate for reduction. Such a procedure shows noticeable disadvantages compared with the procedure of the first paragraph, such as scumming in the dye bath, a pronounced shade difference from the color on wool, discoloration of the polyacrylonitrile fiber, dull shade, uneven dyeings, and a marked tendency to crock.

The above procedure is followed, using the same amount of dye but with different amounts of the cuprous complex salt. When the amount of the cuprous complex salt is from 0.5% to 1.2%, pastel shades are obtained. When the dyeing procedure is followed using 7.5% of the cuprous complex salt, the amount of dye can be increased to from 2 to 5%. Complete exhaustion of the dye is still maintained and the strength builds up proportionate to the amount of dye added. Both with the pastel shades and with the very heavy shades the same desirable qualities of brightness, levelness and excellent fastness to crocking are achieved.

The above dyeing procedures are equally applicable to union dyeing where the polyacrylonitrile fiber is combined with wool. The same bright, level, fast shades are obtained on both fibers.

The procedure described above is followed with other cuprous complex salts, namely, the products of Examples 1, 4, 6, 7, and 8. The dyeings obtained show the same desirable brightness, levelness, and fastness to crocking.

When the above procedures are repeated replacing the dye C.I. 185 with dyes C.I. 202, 235, 275, 801, or 1088 or with the prototype dyes numbers 146 and 326, the results obtained are the same quality.

EXAMPLE 10

A dye bath is made up with a five part skein of thiocyanate spun polyacrylonitrile fiber immersed in 150 parts of water to which are added solutions of 0.05 part of the direct dye of C.I. 346, 0.2 part of sulfuric acid, and 0.075 part of the nitrate of the cuprous complex of dicyandiamide (the product of Example 2, added as a 0.5% solution). Calculated on the weight of the fiber, the various additions are 1% dye, 4% sulfuric acid, and 1.5% of the complex cuprous salt. The bath is heated to 200° F., giving a clear solution, and held at 200° F. until dyeing is complete; the skein is removed, rinsed and dried. There is obtained a yellow dyeing on the fiber fully equal in hue, brightness, and strength to that obtainable on cotton; the dyeing is also uniform and resistant to crocking. In contrast, when this dye is applied to polyacrylonitrile by the conventional cuprous ion methods, from copper sulfate reduced in the bath with hydroxylammonium sulfate, there is observed a precipitation in the dye bath, and the dyeing is duller, less even, susceptible to crocking, and shows a marked shade difference as compared with the color on cotton.

The procedure of the above example is repeated with a union of the polyacrylonitrile fiber with cotton or rayon. Both fibers are dyed smoothly. Replacing the cuprous complex salt of Example 2 with the complexes of the other examples gives the same dyeing results.

When the dye C.I. 346 is replaced with dye C.I. 349a, 365 or Prototypes 47, 71, 72, the same quality of dyeing results.

EXAMPLE 11

A dye bath is prepared using five parts of a skein of thiocyanate spun polyacrylonitrile in 150 parts water, to which are added solutions of 0.05 parts of the dye, C.I. 1088, 0.2 part sulfuric acid, 0.07 part of the nitrate salt of the cuprous dicyandiamide complex (product of Example 2), and 0.025 part hydroxylammonium sulfate. The bath is heated at 200° F. until dyeing is complete, and the skein removed, rinsed, and dried. There is obtained complete exhaust of the bath and the dyeing has fully the strength observed in Example 9, where more of the complex cuprous salt was used. When the dye is applied by the ordinary cuprous ion method, using an equal amount of copper, that is, 0.05 part copper sulfate pentahydrate reduced in the bath with 0.025 part hydroxylammonium sulfate, there is obtained only 80% exhaust of the dye liquor. Moreover, the same undesirable properties are observed as those described in Example 9 while the dyeing made using the complexed cuprous salt has the same advantages.

When the procedure of the above example is carried out substituting the hydroxylammonium sulfate with an equal quantity of sodium dihydrogen hypophosphite or sodium formaldehyde sulfoxylate, the results obtained are the same.

EXAMPLE 12

Five parts of a skein of thiocyanate spun polyacrylonitrile fiber is added to a dyebath composed of 150 parts of water containing 0.05 part of the dye Prototype 144, 0.12 part of the product of the Example 2 and 0.045 part of sodium bisulfite. The bath is heated to 200° F. and maintained at this temperature until dyeing is nearly complete, whereupon 0.1 part sulfuric acid is added and the bath maintained at the same temperature until the exhaustion is complete and the full strength of color is developed on the fiber. This color strength is equal to that obtained with the same amount of dye on wool.

EXAMPLE 13

Five parts of a skein of thiocyanate spun polyacrylonitrile fiber is added to a dye bath composed of 150 parts of water, 0.05 part of the dye C.I. 814, 0.07 part of the product of Example 2, 0.0125 part sodium bisulfite, 0.05 part ammonium hydroxide and 0.5 part ammonium chloride. The bath is heated to 200° F. and is maintained until a complete exhaust results. The strength of dyeing is equal to that obtained on cotton.

EXAMPLE 14

A blend is prepared by thoroughly mixing in solid form 35 parts of the dye C.I. 185 with 65 parts of the product of Example 2. A solution of 0.14 part of this blend is made by warming in 30 parts of water at 180° F. This solution is added to a dye bath containing 5 parts of a skein of thiocyanate spun polyacrylonitrile fiber, 150 parts of water and 0.2 part sulfuric acid. The dye bath is heated to 200° F. and maintained until exhaust is complete. Thereupon, the fiber is removed, rinsed and dried. It is dyed a bright scarlet shade equal in hue, strength and fastness to that obtained by the procedure of Example 9.

The procedure of the example is followed using different cuprous complex salts, namely, products of Examples 1, 4, 6, 7, and 8. The results are the same. When a blend is prepared of 35 parts of a dye C.I. 185, 55 parts of the product of Example 2 and ten parts of sodium bisulfite, a very stable blend is obtained which keeps well, and which, when added to a dye bath as described above, produces the same shade. Same results are obtained when the sodium bisulfite is replaced by an equal amount of either hydroxylammonium sulfate, sodium dihydrogen hypophosphite, monohydrate or sodium formaldehyde sulfoxylate.

EXAMPLE 15

A blend is prepared by thoroughly mixing in solid form 75 parts of the dye C.I. 346 with 25 parts of the product of Example 2. A solution is prepared by warming 0.067 part of the blend in 20 parts of water to 180° F. This solution is added to a dye bath containing 5 parts of a skein of thiocyanate spun polyacrylonitrile fiber, 150 parts of water, and 0.2 part sulfuric acid. The bath is heated to 200° F. and is maintained until exhaustion is substantially complete. A bright yellow dyeing is obtained which is equal in shade, strength, and fastness to that obtained by the procedure of Example 10.

A blend is also prepared substituting 20 parts of the product of Example 2 and 5 parts of sodium bisulfite for 25 parts of the cuprous complex salt. The blend keeps well. When added to a dyebath as described above, it produces the same results. A product of the same characteristics is obtained if the sodium bisulfite is substituted by hydroxylammonium sulfate, sodium dihydrogen hypophosphite monohydrate or sodium formaldehyde sulfoxylate.

EXAMPLE 16

To 150 parts of water at 180° F. is added successively 0.1 part sulfuric acid a soluton of 0.25 part of copper sulfate pentahydrate, a solution of 0.25 part dicyandiamide, 5 parts of thiocyanate spun polyacrylonitrile fiber, a solution of 0.25 part sodium bisulfite and a solution of 0.05 part of the dye C.I. 185. The bath is heated at 200° F. and maintained until exhaustion is complete. The dyed skein is removed, rinsed, and dried and shows substantially the same strength, shade and fastness as the skein dyed by the procedure of Example 9.

EXAMPLE 17

Five parts of a skein of dry spun polyacrylonitrile sold by the Du Pont Company under the trade name of "Orlon 41" is dyed in a dye bath containing 150 parts of water, 0.05 part of dye C.I. 304, 0.07 part of the product of Example 2, 0.0125 part sodium bisulfite, 0.25 part ammonium chloride and 0.1 part sulfuric acid. The bath is heated to 200° F. until substantial exhaust of the dye bath is noted. The skein is removed, rinsed, and dried and is dyed a pastel shade. The shade is much brighter and more uniform than when the same material is dyed by the ordinary cuprous ion method using an equal amount of copper, that is to say, 0.05 part copper sulfate pentahydrate reduced in th bath with 0.025 part hydroxylammonium sulfate.

EXAMPLE 18

Five parts of a skein of acrylonitrile copolymer sold by Union Carbide and Carbon under the trade name "Dynel" is dyed in a bath containing 0.25 part of the product of Example 4, 0.1 part sulfuric acid and 0.05 part of the dye C.I. 179. The bath is heated to 200° F. until considerable exhaust of dye from the bath is noted. The fiber is rinsed, dried, and shows a good strength of dyeing. In the absence of the cuprous complex a very weak tint only is obtained.

EXAMPLE 19

Five parts of a skein of a fiber which is a copolymer of acrylonitrile with a small amount of a vinyl pyridine and sold by the Chemstrand Corporation under the trade name "Acrilan" is dyed in the bath containing 0.25 part of the product of Example 4, 0.1 part sulfuric acid and 0.05 part of the dye C.I. 179. The bath is heated to 200° F. until there is a substantial exhaust of the dye. The skein is then rinsed and dried and shows a good strength of dyeing. When compared with a blank having no cuprous complex the exhaust is much better and the color on the fiber is much stronger.

EXAMPLE 20

To a slurry of 2.31 parts 1-carballyloxy-3-cyanoguanidine in 250 parts water containing a small amount of acetic acid was added 10 parts of a solution containing 1.2 parts copper sulfate pentahydrate. The mixture was heated to 100° C. Then 0.5 part sodium bisulfite was gradually added as a solution. The blue color disappeared and a new precipitate was formed. After further heating at 100° C., the product was isolated by filtration, washed with water, and dried in vacuo. A white powder was obtained which gave a test for cuprous copper with an o-phenanthroline reagent, and a negative test for cupric copper. When added to a dye bath in an amount equal to 5% of the weight of the fiber, together with 1% of the dye of C.I. 179, and 2% sulfuric acid, it gave virtually complete exhaust on a skein of thiocyanate spun polyacrylonitrile fiber. Similar results were obtained by using the dye of C.I. 1088.

EXAMPLE 21

To a solution of 2.00 parts of 1-t-butyl-3-cyanoguanidine in 250 parts of water acidulated with acetic acid was added one part of copper acetate monohydrate. The solution was treated portionwise with 0.5 part sodium bisulfite at 100° C. The product was isolated by filtration, washed with very dilute sulfuric acid, and dried. It gave a positive test for cuprous copper, and when added to a dye-bath acidified with sulfuric acid, it promoted the dyeing of thiocyanate spun polyacrylonitrile fiber with the dyes of C.I. 179 or 1088.

The same results were obtained when in the above procedure instead of 1-t-butyl-3-cyanoguanidine there was used 1-phenyl-3-cyanoguanidine, 1-p-chlorophenyl-3-cyanoguanidine, or 1-methyl-1-phenyl-3-cyanoguanidine.

EXAMPLE 22

To a hot solution containing 1.76 parts of 1-acetyl-3-cyanoguanidine, one part of copper acetate monohydrate, and a small amount of acetic acid in 250 parts of water, was added gradually 0.5 part sodium bisulfite a 100° C. The white precipitate was isolated by filtration, washed with very dilute sulfuric acid, and dried in vacuo. The product was soluble in hot aqueous medium, gave a test for cuprous copper, and promoted the dyeing of spun polyacrylonitrile fiber from a bath acidified with sulfuric acid by means of the dye of C.I. 179 or 1088.

EXAMPLE 23

To a solution of 12.5 parts of copper sulfate pentahydrate in 150 parts of water was added a solution of 22.8 parts of monomethyloldicyandiamide in 100 parts of water. 4.1 parts of crystalline hydroxylammonium sulfate were added gradually at 95° C. After the evolution of gas had ceased, 4.2 parts of sodium nitrate crystals were added, and the mixture was cooled. The precipitate was filtered off, and purified by recrystallization from hot water acidulated with nitric acid. The white crystalline product was recovered by filtration, and washed with alcohol. It gave a positive test for cuprous copper with o-phenanthroline. When 5.5% of the product, on the weight of the fiber, was added to a dye bath containing 1% of the dye of C.I. 179, and 2% sulfuric acid, there was obtained complete exhaustion of the dye on five parts of a skein of thiocyanate spun polyacrylonitrile fiber.

EXAMPLE 24

A solution is prepared of 0.1 part of 50% stock of the cationic agent, stearamidopropyl-dimethyl-hydroxyethyl-ammonium chloride, and 0.1 part by volume of concentrated ammonia in 150 parts of water. Five parts of a skein of thiocyanate spun polyacrylonitrile fiber are scoured by heating in this solution at 160° F. for 10 minutes, after which the skein is removed and rinsed. It is then entered into a bath containing 0.07 part of the acid dye of C.I. 235, 0.025 part of the product of Example 2, and 0.25 part of ammonium chloride, in 150 parts of water, and dyed at 200° F. for one-half hour. Then 0.1 part sulfuric acid is added and the dyeing is continued at 200° F. until exhaustion is virtually complete. The skein is removed, rinsed, and dried. It has a full strength of dyeing equal in quality to that of Example 9 even though much less of the complex cuprous salt was used than in that example.

When the same procedures are used with other acid dyes, C.I. 430, 801, 1078, 1088 and Prototype No. 143, or with direct dyes C.I. 346, 349a and 653 the strong dyeings are obtained.

We claim:
1. The process of preparing a cuprous complex of an organic cyano compound which comprises: forming an aqueous solution containing a cupric copper salt of an inorganic acid, an organic cyano compound selected from the group consisting of the lower aliphatic dinitriles, and oxygenated nitriles, B,B'-dicyanoethyl ether, cyanamide and its di (lower-alkyl) and di (cyano-lower-alkyl) derivatives, cyanoacetamide, cyanoguanidine and a mild reducing agent; heating said solution, whereby reaction is initiated and product cuprous complex salt is precipitated; continuing said heating until precipitation substantially ceases and collecting resultant precipitate.

2. A process according to claim 1 in which said organic cyano compound is dicyandiamide.

3. A process according to claim 1 in which said cupric copper salt is cupric sulfate.

4. A process according to claim 1 in which said cupric copper salt is cupric nitrate.

5. A solid, stable inorganic acid salt of a cuprous copper complex of an organic cyano compound selected from the group consisting of carballyloxy cyanoguanidine, bis-cyanoethyl ether and cyanoacetamide.

References Cited in the file of this patent

UNITED STATES PATENTS

| | | |
|---|---|---|
| 1,642,370 | Jenkins | Sept. 13, 1927 |
| 1,786,125 | O'Kane | Dec. 23, 1930 |
| 2,127,380 | Dearborn | Aug. 16, 1938 |
| 2,150,759 | Carter | Mar. 19, 1939 |
| 2,356,740 | Glenz | Aug. 29, 1944 |
| 2,383,784 | Fleer | Aug. 28, 1945 |
| 2,521,424 | Swaney | Sept. 5, 1950 |
| 2,576,241 | Spangler | Nov. 27, 1951 |
| 2,637,620 | Ham | May 5, 1953 |
| 2,653,074 | Blaker | Sept. 22, 1953 |

OTHER REFERENCES

Morgan: Journ. Chem. Soc., vol. 123 (1923), pp. 2901–7.

Sidgwick: Chemical Elements and Their Compounds, Oxford Univ. Press, London, 1951, vol. 1, pp. 135–6.

Barinova et al.: Chemical Abstracts, vol. 47, p. 1934 (1953); abstracted from Tekstil. Prom. 9, No. 8, 22–4 (1949).